Oct. 12, 1926.
E. F. MURRAY
1,603,142
PROCESS FOR MAKING RUBBER BINDINGS FOR FLOOR COVERINGS
AND THE MEANS FOR CARRYING OUT SAID PROCESS
Filed March 21, 1925    2 Sheets-Sheet 2
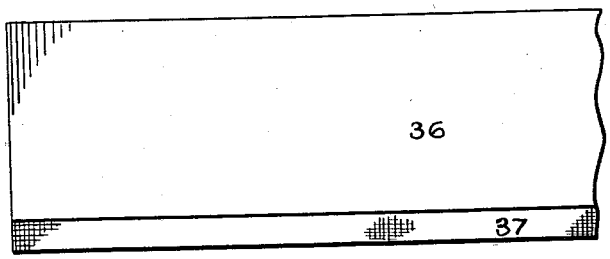 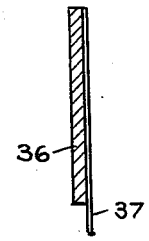
Fig-4    Fig-5
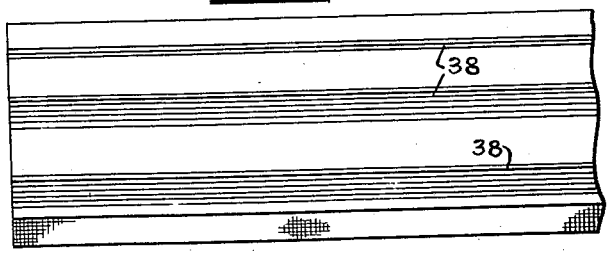 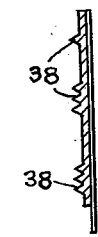
Fig-6    Fig-7
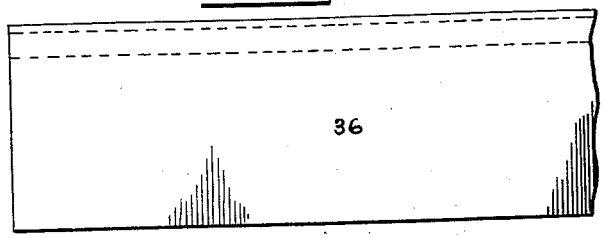 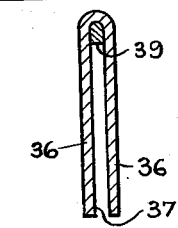
Fig-8    Fig-9
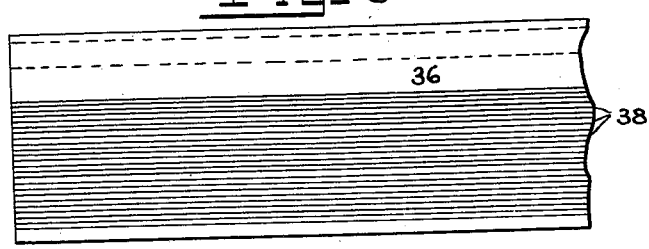 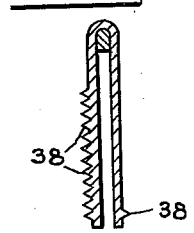
Fig-10    Fig-11
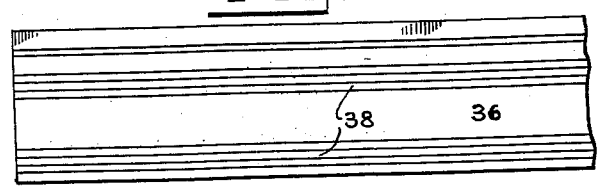
Fig-12    Fig-13
Inventor
Edward F. Murray
By his Attorney
Clarence G. Campbell Patented Oct. 12, 1926.

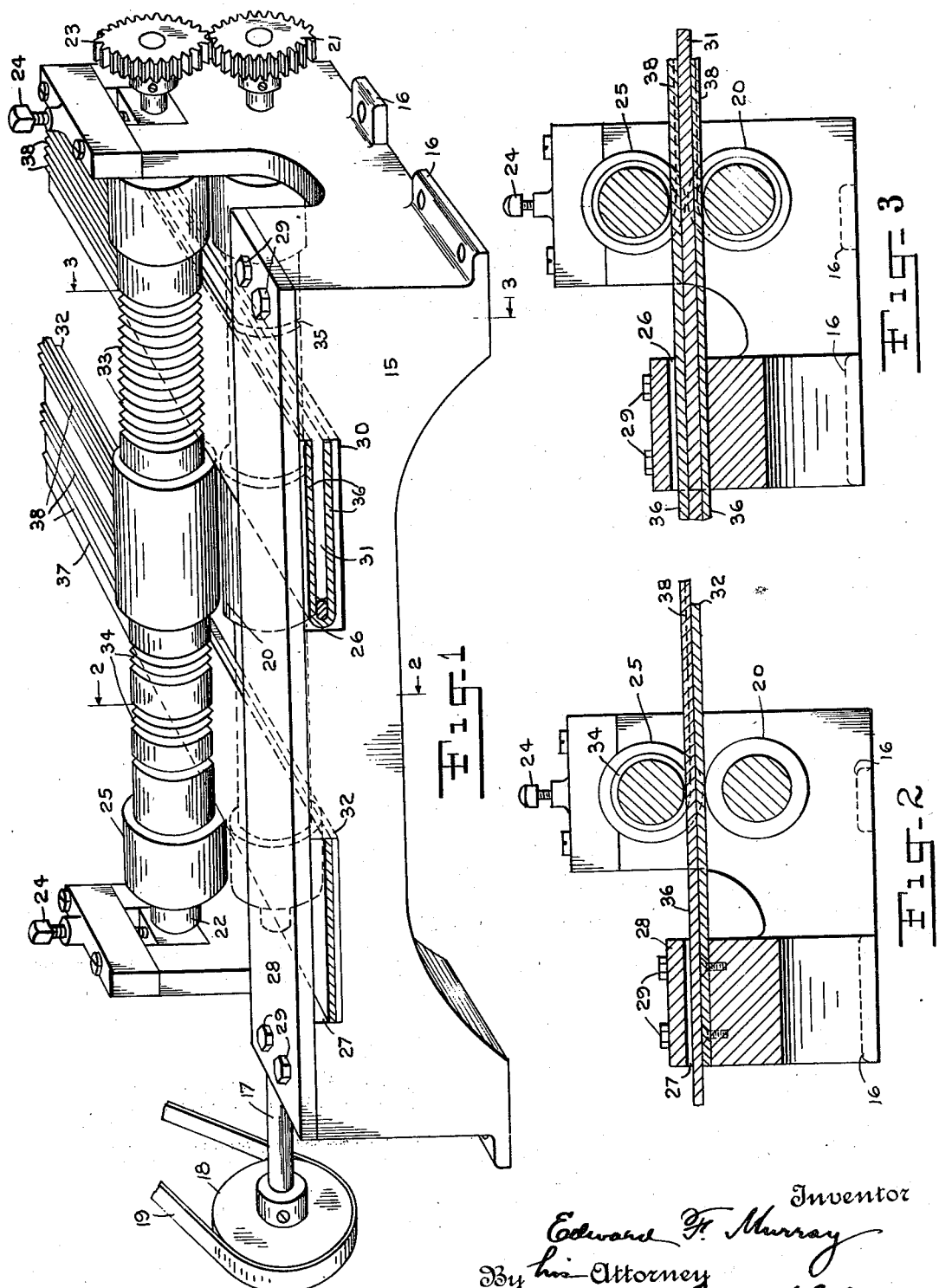

1,603,142

UNITED STATES PATENT OFFICE.

EDWARD F. MURRAY, OF NEW YORK, N. Y., ASSIGNOR TO KNAPP RUBBER BINDING CO., OF NEW YORK, N. Y., A CORPORATION OF NEW YORK.

PROCESS FOR MAKING RUBBER BINDINGS FOR FLOOR COVERINGS AND THE MEANS FOR CARRYING OUT SAID PROCESS.

Application filed March 21, 1925. Serial No. 17,259.

My invention relates to an improvement in a process for making rubber bindings for floor coverings and the machine for carrying out said process and the novelty lies in the steps and in the arrangement and adaptation of the parts for carrying out said process.

In order to properly protect the edges of floor coverings and the edges of coverings used on stairways which are exposed on the edge of the treads it has been the practice for many years to use a rubber binding or nosing, which is especially adapted for and made for these purposes.

These bindings and nosings have to be made with certain corrugations or designs therein in order to fulfill their function properly and the method of making these, which has been in use for many years, has been to take a strip of green rubber which has been calendered on fabric and folding the same and putting a rubber core in said fold, placing long strips of said material in molds and applying hydraulic pressure which will mold only the length of strip governed by the length of the mold. This entails the use of a large amount of labor in the handling of these molds and after the strips are compressed in said molds a large quantity of steam is then used in jackets over said molds to effect a curing of the rubber. The molds are then opened and the strips so formed are trimmed of the excess material, the same as is necessary in all mold practice.

My process and device is adapted to eliminate the use of molds and the large amount of labor in handling the same, as well as eliminating the necessity for trimming the strips after molded and enables the operator to make said strips in a continuous manner cutting them off in the desired lengths and doing the curing in batch lots so as to save time and heat.

In the drawings Figure 1 is a perspective of my completed device showing the strips running through the machine. Figure 2 is a cross section on the line 2—2 of Figure 1. Figure 3 is a cross section on the line 3—3 of Figure 1. Figure 4 is a top plan view of a strip of green rubber calendered on a fabric adapted for use in carrying out my process. Figure 5 is a cross section of Figure 4. Figure 6 is a top plan view of the strip of Figure 4 after it has run through my device. Figure 7 is a cross section of Figure 6. Figure 8 is a top plan view of a folded strip of green rubber calendered on a fabric with a rubber core adapted for use in carrying out my process. Figure 9 is a cross section of Figure 8. Figure 10 is a top plan view of strip shown in Figure 8 after it has run through my device. Figure 11 is a cross section of Figure 10. Figure 12 is a top plan view of a nosing strip having run through my device and been cured. Figure 13 is a cross section of Figure 12.

Referring to the drawings 15 is a base or frame member having fastening means 16 adapted for securing it rigidly to a table or bench in which is mounted a driving shaft 17 driven by pulley 18 and belt 19, driven from a source of power not shown. A roller 20 is mounted on said driving shaft 17 and a cut gear 21 is rigidly secured to the opposite end of the driving shaft 17 from the pulley 18. A driven shaft 22 is also mounted in the frame 15 on which is mounted a roller 25, and a cut gear 23 is rigidly mounted on the shaft 22 so as to mesh with the cut gear 21 and pressure or spacer set screws 24 are also mounted in said frame so as to control the pressure or space between the driving shaft 17 and the driven shaft 22 and therefore the rollers 20 and 25 respectively mounted thereon. A guideway 26 is cut in the frame 15 and a second guideway 27 is also cut therein and a plate 28 is secured over said guideways being fastened to the frame 15 at 29. The guideway 26 has a base or guide-plate 30 rigidly mounted therein and extending a substantial distance beyond the frame 15 on the further side of the same as shown in Figure 1 so as to serve as a base or guide member for material being fed through the guideway 26. An arbor member 31 is rigidly mounted in said guideway 26 parallel to the base member 30 and approximately one-half way between said base member 30 and the upper portion of the guideway 26. The guideway 27 has a base member 32 rigidly mounted therein and extending a substantial distance beyond the further side of the frame 15 as shown in Figure 1 so as to serve as a runway for material fed through said guideway. The roller 25 has circular cut outs 33 adapted to imprint the desired design upon the material rolled in under said roller. The second series of circular cut out members 34 is also made on the roller 25 to effect another design on the material run thereunder. A circular cut out member 35 is made on the roller 20 to effect the desired design on the lower side of the material run between the rollers 25.

In carrying out my process a strip of green rubber 36 which has been calendered onto a back fabric 37 is adapted to be run through the guideway 27 and passing between the rollers 20 and 25 which are rotating through the driving of the pulley 18 and shaft 17, which motion is transferred through gears 21 and 23, will effect the making of desired ridges 38 on the face of said green rubber 36. In Figure 9 as shown in cross section a folded strip having a back fabric 37 and a green rubber coating 36 which has been calendered thereon and a rubber core 39 which has been mounted in the fold, and as this folded strip is placed in the guideway 26 with the arbor 31 between the two sides of said folded strip and my machine started into operation as before described, said two faces 36 of green rubber will be imprinted by the cut outs 36 and 35 so as to form the desired design of ridges 38 thereon. As these strips of imprinted rubber are run through my device and imprinted as described, they can then be cut off in the lengths as may be desired. These strips as imprinted and cut will then be placed in a suitable vat or tank and cured in the well known manner. In the strips shown in Figures 4, 5, 6 and 7, which are particularly adapted for nosings for stair treads, the curing will be effected in the usual manner by binding the strips after imprinting on a mandrel before curing so as to cure them in a curved position as shown in Figures 12 and 13.

Many variations may be made in the particular form of device used without departing from the spirit of my invention.

I claim:—

1. The process of making rubber bindings for floor coverings comprising the placing of a rubber core in the fold of a folded strip of green rubber calendered on fabric, running said strip through rollers so as to form simultaneously the particular design required upon the outside of each half of said strip, cutting said strip in the lengths desired and curing the same in batch lots in the usual manner.

2. The process of making rubber bindings for floor coverings comprising the continuous imprinting of the desired design upon a strip of green rubber calendered on fabric between rollers while holding said strip in a guideway, cutting said strip in the lengths desired and curing the same in batch lots in the well known manner.

3. In a machine adapted to form a rubber binding for floor covers, a frame member, a driving roller and a driven roller supported in said frame, design forming elements on each of said rollers, means for controlling the space between said rollers, a guideway between said rollers and an arbor rigidly mounted in said guideway.

4. In a machine adapted to form a rubber binding for floor coverings, a frame member, a driving roller and a driven roller supported therein, a design forming element on said driven roller, means for controlling the space between said rollers and a guideway for holding said strip between said rollers.

In testimony whereof I affix my signature.

EDWARD F. MURRAY.